E. B. HARRIS.
WAGON BRAKE.
APPLICATION FILED JUNE 23, 1919.
1,342,381.
Patented June 1, 1920.
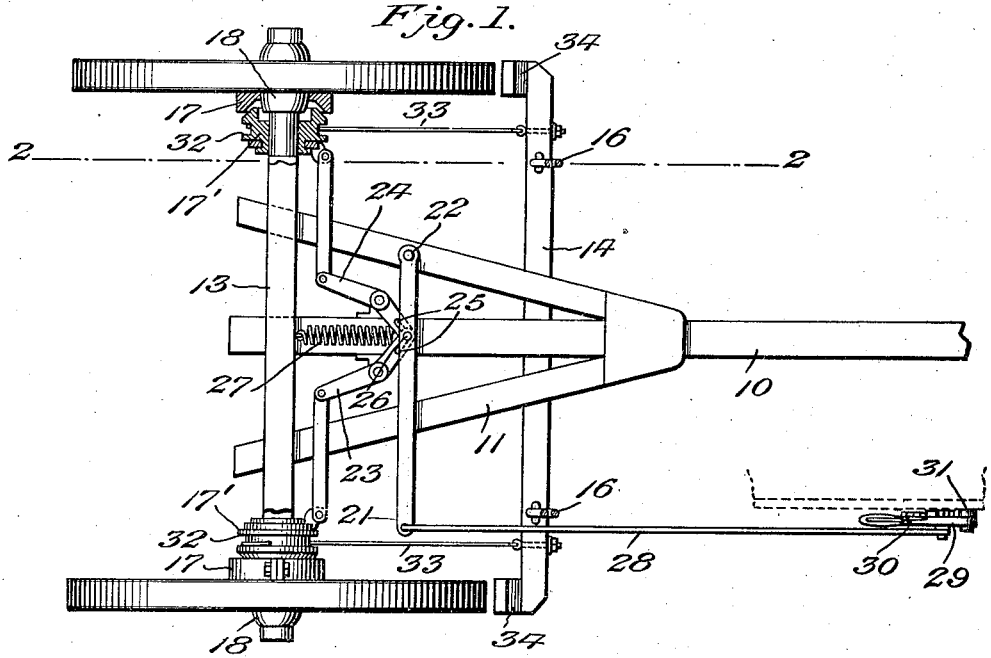
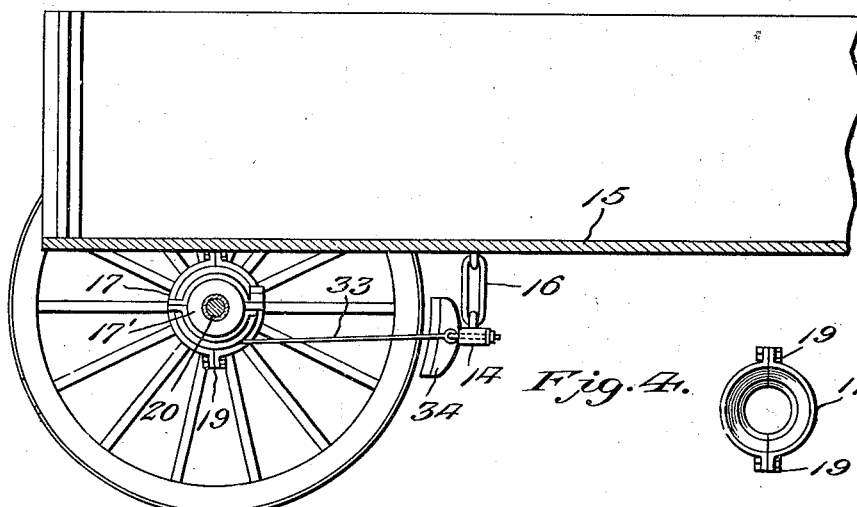
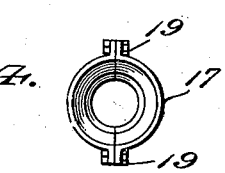
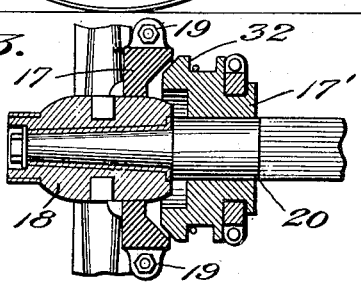
Inventor
E. B. Harris
By Victor J. Evans
Attorney

UNITED STATES PATENT OFFICE.

EDWARD B. HARRIS, OF HILLSBORO, OREGON.

WAGON-BRAKE.

1,342,381.   Specification of Letters Patent.   Patented June 1, 1920.

Application filed June 23, 1919. Serial No. 305,950.

*To all whom it may concern:*

Be it known that I, EDWARD B. HARRIS, a citizen of the United States, residing at Hillsboro, in the county of Washington and State of Oregon, have invented new and useful Improvements in Wagon - Brakes, of which the following is a specification.

This invention relates to wagon brakes and comprehends the provision of means whereby the momentum of the wagon is utilized to apply the brakes.

The nature and advantages of the invention will be better understood when the following detailed description is taken in connection with the accompanying drawing the invention residing in the construction, combination and arrangement of parts as claimed.

In the drawings forming part of this specification, like numerals of reference indicate similar parts in the several views and wherein:—

Figure 1 is a plan view of the brake mechanism, partly in section, showing the normal position of parts.

Fig. 2 is a sectional view taken on line 2—2 of Fig. 1, showing a wagon body partly in section.

Fig. 3 is a detail sectional view of one of the clutches.

Fig. 4 is a view in elevation of one of the clutch members.

Referring more particularly to the drawing in detail, 10 indicates the reach bar, at one end of which the axle supporting hound is indicated at 11. The wheels 12 are associated with the axle 13 in the usual manner, while the brake beam is suspended from the bottom of the wagon body by means of the links 16.

In carrying out my invention, I provide a clutch mechanism, the relatively fixed members 17 of which are secured to the hub 18 of the wheels for rotation therewith. If desired, these members may be made in two sections and bolted or otherwise suitably secured together as at 19. The relatively movable members 17' are arranged to slide upon the axle 13, and if desired these members may be also made in sections to facilitate their association with the axle. The clutch may be made of any suitable construction, that is to say the coöperating members 17 and 17' respectively may be provided with teeth, or it may be of the cone type as shown. The members 17 are arranged to slide upon the sleeves or casting 20 which latter provide a smooth bearing surface as will be readily understood. It might be here stated that the sleeves or castings 20 may be of any suitable cross sectional configuration to accommodate axles of different tractors.

Any suitable means may be employed for throwing the clutch mechanism into operation for the purpose to be hereinafter described, but as shown in this specific instance a lever 21 is extended transversely across the hound 11 and has one end pivoted thereto as indicated at 22. The series of pivotally connected links provide an operative connection between the lever 21 and each of the members 17' of the clutch mechanism and these respective series are indicated at 23 and 24. The two adjacent links of the respective series are provided with slots 25 for the reception of a pin 26 carried by the lever 21, this slot and pin connection providing for the proper connection of each series of links when the lever 21 is moved under the influence of the spring 27 to throw the clutch mechanism into operation. A rod 28 extends from the lever 21 to the hand actuated lever 29 adjacent the driver's seat, the lever 29 carrying a pawl 30 coöperating with a rack bar 31 for holding the lever 29 in a given position.

Each of the members 17' of the clutch mechanism is provided with an annular groove 32, in which one end of a flexible cable 33 is secured, the opposite end of this cable being attached to the brake beam 14. The cable 33 is adapted to be wound about the member 17' within the grooves 32, subsequent to the throwing of the members 17' into operative engagement with their coöperating members 17, and manifestly the pull exerted upon the cables under such conditions results in the application of the brakes 34 to the wheels 12.

In practice, the lever 29 normally assumes the position illustrated in Fig. 1 thus holding the lever 21 and its associated parts including the relatively movable members 17' to its inactive position. When it is desired to apply the brakes, the lever 29 is released from the rack 31 by the driver and upon release of the lever 29 the spring 27 functionates to throw the lever 21 on its pivot in a direction of the axle 13, thus imparting movement to the members 17', sliding the latter into operative association with the fixed members 17. The members 17' then rotate with the members 17, and as a consequence, the cables 33 are wound within the grooves 32, exerting a pull upon the brake beam 14 and applying the brake. The brakes may be released and the parts returned to normal position by a reverse movement of the lever 29.

If desired, the rod 29 may be extended from the brake beam to a convenient part of the harness and under normal conditions while the animal is pulling, the brakes are maintained inactive. However, when descending down grades, the brakes will be automatically applied by the movements of the animals as will be readily apparent.

While I have shown and described what I consider the preferred embodiment of the invention, I desire to have it understood that I do not limit myself in this connection, and that such changes may be resorted to when desired as fall within the scope of what is claimed.

What I claim is—

1. A wagon brake comprising clutch members fixed to the wheels of the wagon, for rotation therewith, coöperating clutch members slidably mounted upon the axle of the said wheels, means normally holding said clutch members separated, means for automatically associating said members upon release of the first mentioned means, said sliding clutch members having grooves, a flexible connection between said sliding clutch members and the brakes and said flexible connection being adapted to be wound within the grooves to automatically apply the brakes when said clutch members are operatively associated.

2. A wagon brake comprising clutch members fixed to the wheels of the wagon for rotation therewith, coöperating clutch members slidably mounted upon the axle of said wheel, a lever pivoted at one end, a connection between the lever and the sliding clutch members whereby movement of said clutch members is controlled by said lever, a hand operating lever, a connection between the latter mentioned lever and the clutch controlling lever, whereby the latter mentioned lever is normally maintained in position to hold the clutch members separated, yieldable means operable to automatically move the lever to an active position and to throw the clutch members into operative association, and a connection between the sliding clutch members and the brakes, whereby the latter are effectively applied when said clutch members are operatively associated.

In testimony whereof I affix my signature.

EDWARD B. HARRIS.